United States Patent
Benson

(10) Patent No.: US 8,220,371 B2
(45) Date of Patent: Jul. 17, 2012

(54) PIPE TURNING TOOL

(75) Inventor: Dan Thomas Benson, Tomball, TX (US)

(73) Assignee: Oceaneering International, Inc., Houston, TX (US)

( * ) Notice: Subject to any disclaimer, the term of this patent is extended or adjusted under 35 U.S.C. 154(b) by 447 days.

(21) Appl. No.: 12/544,427

(22) Filed: Aug. 20, 2009

(65) Prior Publication Data

US 2011/0041343 A1 Feb. 24, 2011

(51) Int. Cl.
*B26D 3/00* (2006.01)
*B23D 21/14* (2006.01)

(52) U.S. Cl. .................... 83/54; 83/178; 30/97; 30/96

(58) Field of Classification Search .............. 30/92–108, 30/90.1; 83/54, 48, 13, 178, 375–382, 391–395, 83/451–456, 465, 467.1–468
See application file for complete search history.

(56) References Cited

U.S. PATENT DOCUMENTS

| | | | | |
|---|---|---|---|---|
| 806,878 A * | 12/1905 | Doyle | ............................. | 30/106 |
| 3,157,076 A * | 11/1964 | Arthur | ............................ | 82/128 |
| 3,431,646 A * | 3/1969 | Young | ............................. | 30/97 |
| 3,732,618 A * | 5/1973 | Lorenz | ............................ | 30/97 |
| 3,911,574 A * | 10/1975 | Jones | .............................. | 30/105 |
| 3,958,329 A * | 5/1976 | Mundy | ............................ | 30/97 |
| 4,307,512 A * | 12/1981 | Phillips | ........................... | 30/94 |
| 4,347,664 A * | 9/1982 | Petrillo | ............................ | 30/97 |
| 4,369,573 A * | 1/1983 | Vitale | .............................. | 30/105 |
| 4,422,238 A * | 12/1983 | Kloster | ............................ | 30/101 |
| 4,424,629 A * | 1/1984 | Schott | ............................ | 30/105 |
| D273,194 S * | 3/1984 | House | ........................... | D15/139 |
| 4,466,185 A * | 8/1984 | Montiero | ........................ | 30/103 |
| 4,576,070 A * | 3/1986 | Fitzgerald | ......................... | 82/82 |
| 4,603,463 A * | 8/1986 | Wolbert et al. | ............. | 29/402.07 |
| 4,893,675 A * | 1/1990 | Skipper | ........................ | 166/55.8 |
| 4,932,125 A * | 6/1990 | Poveromo | ....................... | 30/103 |
| 4,939,964 A * | 7/1990 | Ricci | .............................. | 82/113 |
| 4,953,292 A * | 9/1990 | Tobey | ............................. | 30/97 |
| 5,081,768 A * | 1/1992 | Brennan et al. | ................ | 30/101 |
| 5,499,453 A * | 3/1996 | Brauchitsch | .................... | 30/105 |
| D400,075 S * | 10/1998 | Martelle | ......................... | D8/70 |
| 5,815,926 A * | 10/1998 | Ekern | ............................. | 30/103 |
| 6,658,717 B2 * | 12/2003 | Takasaki et al. | ................ | 29/557 |
| 6,915,853 B2 * | 7/2005 | Bakke et al. | .................. | 166/298 |
| 7,316,069 B2 * | 1/2008 | Graybeal | .......................... | 30/92 |
| 7,562,611 B2 * | 7/2009 | Chen | ................................ | 83/597 |
| 7,574,807 B1 * | 8/2009 | Fuller et al. | ..................... | 30/388 |
| 7,765,906 B2 * | 8/2010 | Ueno | ................................ | 83/54 |
| 2002/0023755 A1 * | 2/2002 | McGarian | ..................... | 166/361 |
| 2003/0221527 A1 * | 12/2003 | Lee | .................................. | 83/184 |

* cited by examiner

*Primary Examiner* — Sean Michalski
(74) *Attorney, Agent, or Firm* — Gary R. Maze; Berenbaum Weinshienk PC

(57) ABSTRACT

A pipe tool, useful for cutting, removing a weld, and/or truing a pipe, comprises a housing; a drive interface; a gripper selectively insertable into an inner annulus of a pipe and movable independently of the housing, the gripper comprising a selectively expandable grip; a radially disposed cutter adapted to selectively engage a predetermined portion of an outer surface of the pipe, the cutter movable independently of the housing and the gripper; and a motor operatively in communication with the drive interface. In embodiments, a pipe is cut by maneuvering the pipe tool proximate an open end of a pipe, moving the gripper into the pipe; extending the grip to engage an interior wall of the pipe and secure the pipe tool from movement relative to the pipe; advancing the exposed face to a predetermined position relative to the pipe; axially advancing the cutter to engage an outer wall of the pipe; and rotating the housing until the cutters perform the desired cutting operation on the pipe.

26 Claims, 3 Drawing Sheets

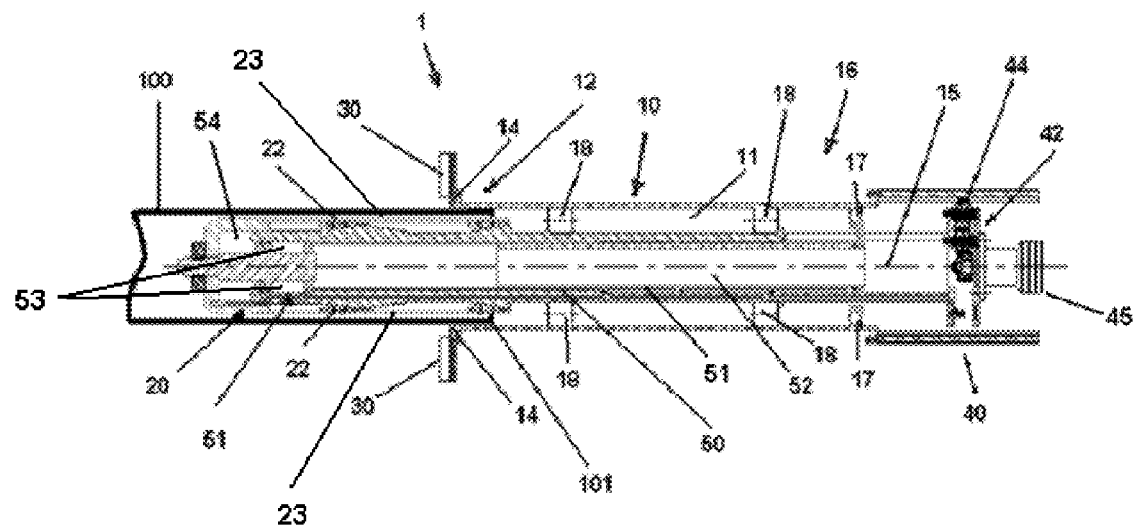
FIGURE 1
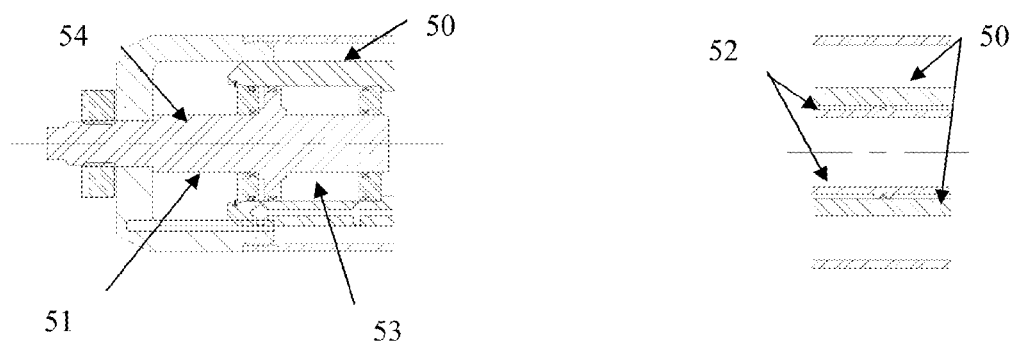
FIGURE 1a
FIGURE 1b

PIPE TURNING TOOL

FIELD OF THE INVENTION

The invention relates to tools used to machine pipes. More specifically, the invention relates to tools used to machine pipes underwater such as by cutting, removing welds, and/or truing the pipe's open end.

BACKGROUND OF THE INVENTION

Pipes, especially those located subsea, may need to be repaired. Sometimes the repair involves separating pipes at a junction or cutting pipes into new sections to effect the repair.

In some cases, a weld or other seam may be present which needs to be removed. Further, pipe openings that are cut and prepared may further need to be trued. This is especially true where there are metal-to-metal seals or where is desirable to have a metal-to-metal seal such as when a flange is desired at the pipe opening.

It is also advantageous to prepare the pipe opening without thinning the pipe wall.

BRIEF DESCRIPTION OF THE DRAWINGS

The various drawings supplied herein are representative of one or more embodiments of the present inventions.

FIG. 1 is a view of a longitudinal cutaway of an exemplary pipe tool, with FIG. 1a being a cross-sectional view of a portion of the pipe tool in cutaway illustrating piston 54 and cylinder 53 and FIG. 1b being a cross-sectional view of a portion of the pipe tool in cutaway illustrating a cylinder volume formed between first end 51 of piston 54 and mandrel 50;

DETAILED DESCRIPTION OF EXEMPLARY EMBODIMENTS OF THE INVENTION

Figure 2:
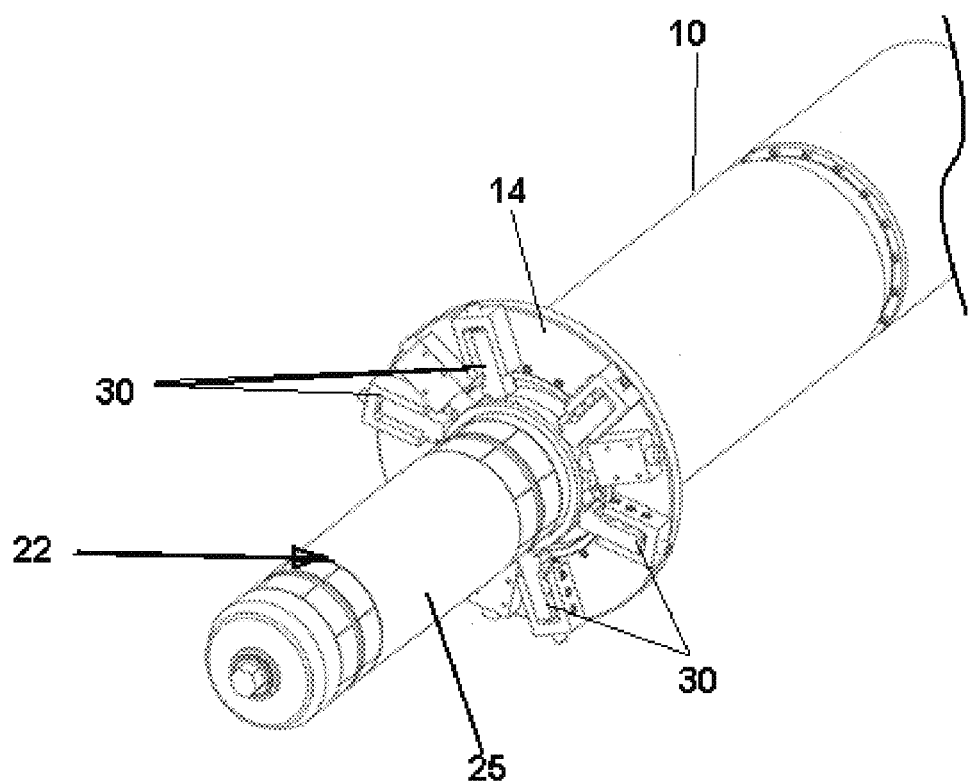
FIG. 2 is a view in partial perspective of an exemplary pipe tool.
Figure 3:
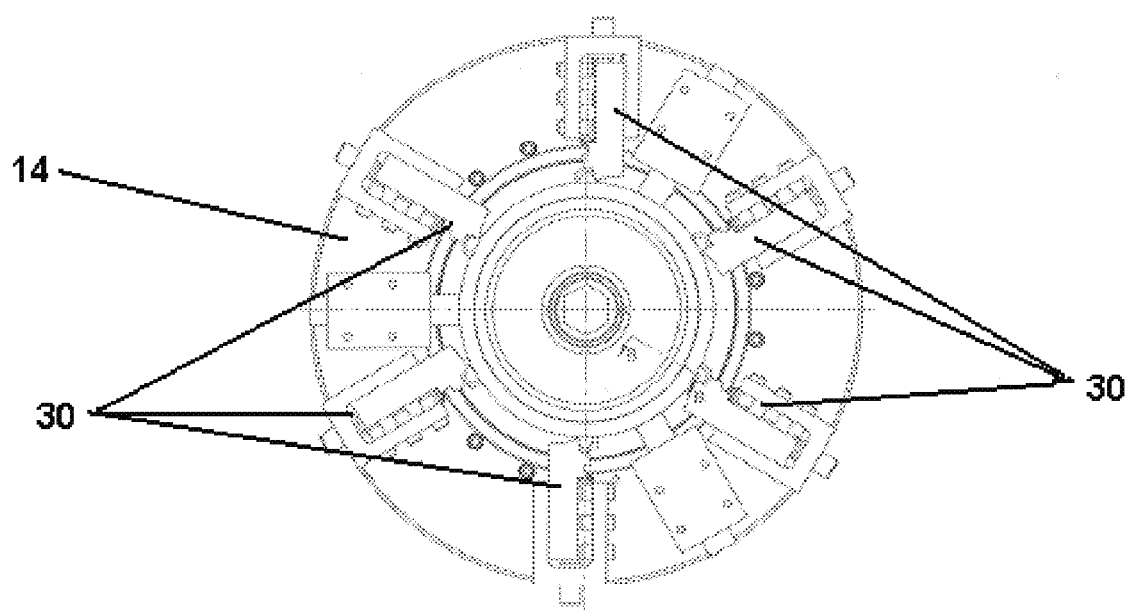
FIG. 3 is a view in section of a cutter section of an exemplary pipe tool.

Referring now to FIG. 1, pipe tool 1 comprises housing 10, which further comprises interior annulus 11 and exposed face 14 at first end 12 of housing 10; drive interface 40 disposed at second end 16 of housing 10, distal from first end 12; mandrel 50, disposed within interior annulus 11 and movable independently of housing 10; gripper 20 dimensioned and configured to be selectively insertable into an inner annulus of pipe 100, gripper 20 movable independently of housing 10; and cutter 30 radially disposed proximate housing exposed face 14. In its preferred embodiment pipe, turning tool 1 comprises three sections, each of which is operative hydraulically independent of the other sections. For example, housing 10 may be advanced or retreated, gripper 20 may grip or loosen its grip, and cutter 30 may rotate hydraulically independent of movement of the other sections.

Housing 10 is typically dimensioned and configured to be rotatable about an inner axis via drive interface 40, such as about longitudinal axis 15 of housing 10.

Drive interface 40 is dimensioned and configured to provide rotational movement about longitudinal axis 15 of housing 10. In preferred embodiments, drive interface 40 further comprising planetary gear train 42 and long internal gear 47 (FIG. 5) operatively in communication with planetary gear train 42.

Gripper 20 comprises one or more selectively expandable grips 22 dimensioned and configured to selectively engage and disengage an interior surface of pipe 100. In currently preferred embodiments, one or more of the grips 22 may comprise collet 25 (FIG. 2).

Gripper 20 typically comprises piston 54 which is movably disposed at least partially within mandrel 50. In these configurations, gripper 20 further comprises selectively expandable grip 23 which is disposed proximate first end 51 of piston 54. Cylinder volume 53 (FIG. 1b) is typically formed between first end 51 of piston 54 and the mandrel 50.

Mandrel 50 typically further comprises cylinder 53 (FIG. 1a). In currently preferred embodiments, mandrel 50 is dimensioned and configured for use with hydraulics such as by having an internally drilled fluid passageway for use without a hydraulic hose. Mandrel 50 also typically forms the outer diameter of two cylinders, one to actuate collet 25, the second to translate housing 10.

Piston 52 is dimensioned and configured to be selectively displaceable along longitudinal axis 15. In certain embodiments, piston 52 is operatively in communication with housing 10 such as by use of one or more thrust bearings 17. In certain embodiments, mandrel 50 is slotted in one or more places, such as three or more places, and spokes on thrust bearing 17 register with these slots.

Additional bearings, such as bearings 18, may be disposed in housing interior annulus 11 intermediate an inner surface of housing 10 and an outer surface of mandrel 50. These bearings 18 may be radial roller bearings, radial ball bearings, or the like, or a combination thereof.

Cutter 30 is adapted to selectively engage a predetermined portion of an outer surface of pipe 100 and is further operatively in communication with drive interface 40 and movable independently of mandrel 50 and gripper 20. In an embodiment, cutter 30 is attached to housing 10 such that, when engaged, piston 52 advances housing 10 axially with respect to pipe 100. Cutter 30, which may comprise one or more such cutters 30, may be fixed in place or be radially slidingly engageable about housing exposed face 14.

Figure 4:
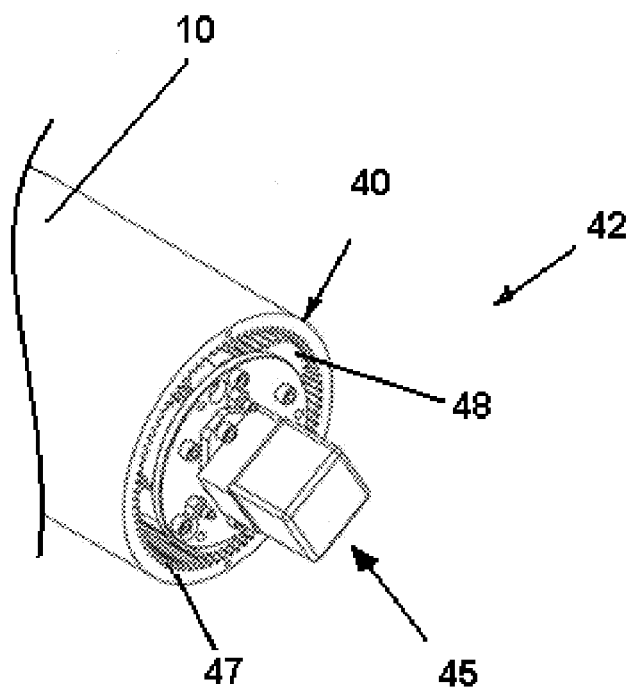
FIG. 4 is a view in partial perspective of planetary gear train of an exemplary pipe tool.
Figure 5:
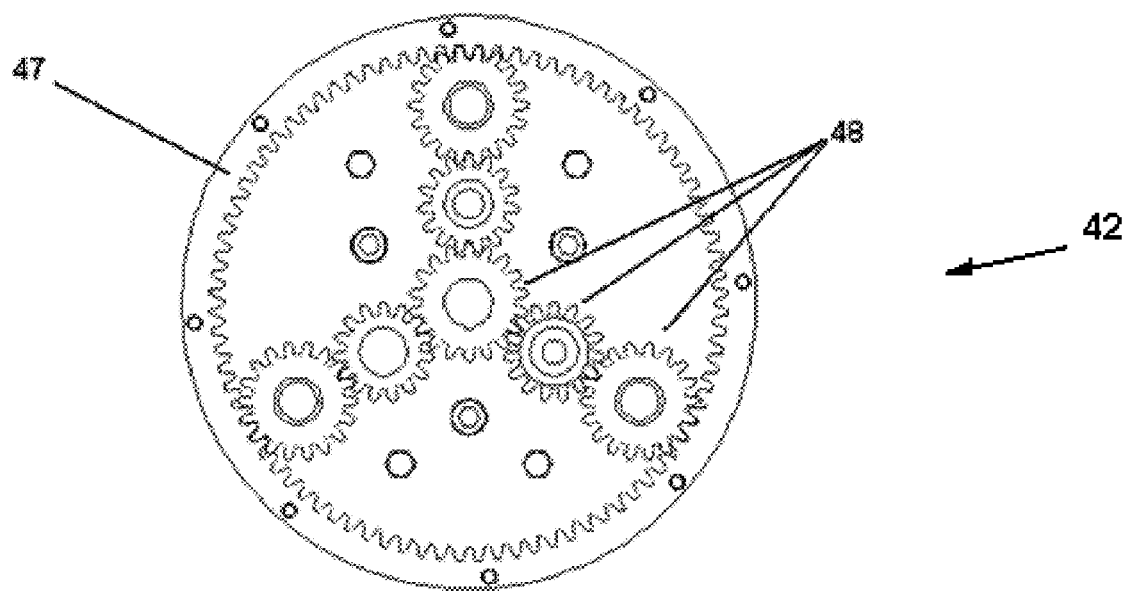
FIG. 5 is a view in section of planetary gear train of an exemplary pipe tool.

In typical embodiments, motor 45 communicates through sun gear and planets 48 (FIGS. 4-5) to long internal gear 47 (FIGS. 4-5). In the preferred embodiment, motor 45 is a geroter hydraulic motor.

In the operation of preferred embodiments, still referring generally to FIG. 1, in general cutting pipe 100 comprises maneuvering pipe tool 1 proximate open end 101 of pipe 100; moving mandrel 50 into pipe 100 until gripper 20 is positioned within pipe 100 at a desired distance into pipe 100; extending or expanding gripper 23 to engage an interior wall of pipe 100 and secure mandrel 50 from movement relative to pipe 100; advancing exposed face 14 to a predetermined position relative to open end 101 of pipe 100; rotating housing 10 and axially advancing cutter 30 to engage an outer wall of pipe 100, e.g. at open end 101; and continuing to rotate housing 10 until cutter 30 performs the desired cutting operation on pipe 100.

Gripper 20, when expanded, may also center pipe tool 1 with respect to the inner annulus of pipe 100.

Cutter 30 may comprise one or more cutters 30 and is typically attached to housing 10, as described herein above. In a preferred embodiment, energizing piston 52 advances cutter 30 and housing 10 axially with respect to the inner annulus of pipe 100. In currently contemplated embodiments, cutter 30 may be further used to remove a weld seam from pipe 100 during the axially advancing of cutter 30.

In some embodiments, cutting also includes truing pipe 100. For example, cutter 30 may be further used to reduce the outer surface of pipe 100 at the cut edge to a required dimension, e.g. nominal, during the axially advancing of cutter 30.

Piston 52 typically translates back and forth within mandrel 50, e.g. along longitudinal axis 15. The motion of piston 52 is usually transmitted to housing 10 via thrust bearings 17. Hydraulic fluid is communicated to piston 52 such as through drillings in mandrel 50.

With respect to motion of housing 10, pipe tool 1 is typically powered via a hydraulic motor 45 thru planetary gear train 42 to long internal gear 47 (FIGS. 4-5). Housing 10 typically rotates on radial roller bearings 18.

In the preferred embodiment, motor 45 only provides rotation. In this embodiment, gripper 23, which may comprise collet 25 (FIG. 2), runs on a first hydraulic circuit, rotation of cutter 30 runs on a second hydraulic circuit, and axial movement of housing 10 is provided through a third hydraulic circuit.

The foregoing disclosure and description of the inventions are illustrative and explanatory. Various changes in the size, shape, and materials, as well as in the details of the illustrative construction and/or a illustrative method may be made without departing from the spirit of the invention.

I claim:

1. A pipe tool, comprising:
   a. a housing, comprising:
      i. an interior annulus; and
      ii. an exposed face at a first end of the housing;
   b. a drive interface disposed at an end of the housing distal from the first end of the housing;
   c. a gripper dimensioned and configured to be selectively insertable into an inner annulus of a pipe, the gripper movable independently of the housing, the gripper comprising a selectively expandable grip dimensioned and configured to selectively engage and disengage an interior surface of the pipe;
   d. a cutter disposed radially proximate the housing exposed face, the cutter adapted to selectively engage a predetermined portion of an outer surface of the pipe, the cutter operatively in communication with the drive interface and movable independently of the housing and the gripper; and
   e. a motor operatively in communication with the drive interface.

2. The pipe tool of claim 1, wherein the drive interface is dimensioned and configured to provide rotational movement about a longitudinal axis of the housing, the drive interface further comprising:
   a. a planetary gear train; and
   b. a long internal gear operatively in communication with the planetary gear train.

3. The pipe tool of claim 1, wherein the drive interface further comprises:
   a. plurality of gear teeth disposed at an end of the housing distal from the exposed face; and
   b. a gear box dimensioned and configured to engage the plurality of gear teeth, the gear box disposed proximate the exposed face of the housing.

4. The pipe tool of claim 3, wherein the gears are dimensioned and configured to constantly mesh with the gear box.

5. The pipe tool of claim 3, wherein the gear box is selectively engagement with the plurality of gear teeth.

6. The pipe tool of claim 1, wherein the housing is dimensioned and configured to be rotated relative to an inner axis via the drive interface.

7. The pipe tool of claim 1, wherein:
   a. the gripper further comprises a piston movably disposed at least partially within the housing interior annulus; and
   b. the selectively expandable grip is disposed at a first end of the piston.

8. The pipe tool of claim 7, further comprising a bearing disposed in the housing interior annulus intermediate an inner surface of the housing and an outer surface of the piston.

9. The pipe tool of claim 8, wherein the bearing is at least one of a radial load bearing and an axial thrust bearing.

10. The pipe tool of claim 7, wherein the piston further comprises a mandrel, the mandrel further comprising an internally drilled fluid passageway.

11. The pipe tool of claim 7, wherein the piston is dimensioned and configured to be selectively displaceable along the longitudinal axis of the housing.

12. The pipe tool of claim 7, wherein the piston is operatively in communication with the housing.

13. The pipe tool of claim 1, wherein the gripper further comprises a plurality of grips.

14. The pipe tool of claim 13, wherein one of the plurality of grips comprises a collet.

15. The pipe tool of claim 1, wherein the cutter is dimensioned and configured to be advanced at least one or by being attached to the housing such that, when engaged, the motor advances the housing axially with respect to the pipe or by movement of the hydraulic piston.

16. The pipe tool of claim 1, wherein the cutter may be fixed or radially, slidingly engageable about the housing exposed face.

17. The pipe tool of claim 1, wherein the cutter comprises a plurality of cutters.

18. The pipe tool of claim 1, wherein each of the housing, gripper, and cutter is dimensioned and configured to be operative hydraulically independent of the other.

19. A method of cutting a pipe, comprising:
   a. maneuvering a pipe tool proximate an open end of a pipe, the pipe tool comprising
      i. a housing, comprising:
         1. an interior annulus; and
         2. an exposed face at a first end of the housing;
      ii. a drive interface disposed at an end of the housing distal from the first end of the housing;
      iii. a gripper dimensioned and configured to be selectively insertable into an inner annulus of a pipe, the gripper movable independently of the housing, the gripper comprising a selectively expandable grip dimensioned and configured to selectively engage and disengage an interior surface of the pipe;
      iv. a cutter disposed radially proximate the housing exposed face, the cutter adapted to selectively engage a predetermined portion of an outer surface of the pipe, the cutter operatively in communication with the drive interface and movable independently of the housing and the gripper; and
      v. a motor operatively in communication with the drive interface;
   b. moving the gripper into the pipe;
   c. extending the grip to engage an interior wall of the pipe and secure the pipe tool from movement relative to the pipe;
   d. advancing the exposed face to a predetermined position relative to the pipe;

e. axially advancing the cutter to engage an outer wall of the pipe; and f. rotating the housing until the cutters perform the desired cutting operation on the pipe.

20. The method of claim 19, further comprising using the expanded gripper to center the tool with respect to the pipe inner annulus.

21. The method of claim 19, wherein the cutter is attached to the housing, the method further comprising turning the housing axially with respect to the pipe inner annulus when axially advancing the cutter.

22. The method of claim 19, further comprising using the cutter to remove a weld seam during the axially advancing of the cutter.

23. The method of claim 19, further comprising using the cutter to reduce the outer surface of the pipe at the cut edge to nominal during the axially advancing of the cutter.

24. The method of claim 19, wherein axially advancing the cutter to engage an outer wall of the pipe uses at least one of the motor which is constantly engaged with the drive interface such that, when engaged, the motor advances the housing axially with respect to the pipe or by movement of the hydraulic piston.

25. The method of claim 19, wherein:

a. the piston is operated to translate along a longitudinal axis of the housing; and b. piston motion is transmitted to the housing via a thrust bearing.

26. The method of claim 19, wherein:

a. the motor only provides rotation;

b. the collet runs on a first hydraulic circuit;

c. rotation of the cutter runs on a second hydraulic circuit; and d. axial movement of the housing is provided through a third hydraulic circuit.

* * * * *